United States Patent [19]

Volk

[11] 4,363,252

[45] Dec. 14, 1982

[54] MULTIPLE BLADE CIRCULAR SAWING MACHINE

[75] Inventor: Karl Volk, Freiburg, Fed. Rep. of Germany

[73] Assignee: Interholz Technik GmbH, Fed. Rep. of Germany

[21] Appl. No.: 245,695

[22] Filed: Mar. 19, 1981

[30] Foreign Application Priority Data

Mar. 27, 1980 [DE] Fed. Rep. of Germany ....... 3011926

[51] Int. Cl.³ .............................................. B27B 5/04
[52] U.S. Cl. .................................... 83/422; 83/425.4; 83/435; 83/435.2
[58] Field of Search ...................... 83/422, 435, 435.2, 83/425.4, 113, 118–122

[56] References Cited

U.S. PATENT DOCUMENTS 1,271,473  7/1918  Johnson ........................... 83/422 X
1,854,481  4/1932  Mudd ............................... 83/345 X
4,075,917  2/1978  Kistner ............................. 83/422

Primary Examiner—James M. Meister
Attorney, Agent, or Firm—Hill, Van Santen, Steadman, Chiara & Simpson

[57] ABSTRACT

In order to be able to cut short workpieces by means of a multiple blade circular sawing machine a separate depresser member is provided for each saw blade. This depresser member has a slot which extends in the longitudinal direction of this member and through which the respective saw blade projects. A depresser member is so connected to an associated displacer head that together therewith it is displaceable to a defined position and is fixable in this position. Furthermore, at least one presser roller is provided in each depresser blade on both sides of the saw blade in the sawing region and the workpiece to be sawn is pressed thereby against a conveyor chain.

7 Claims, 2 Drawing Figures

MULTIPLE BLADE CIRCULAR SAWING MACHINE

FIELD OF THE INVENTION

The present invention relates to a multiple blade circular sawing machine, having at least two circular saw blades which are mounted on a power-driven shaft at a spacing which is adjustable by means of a fixable displacing head, a conveyor chain extending below the circular saw blades for the continuous feed of the workpieces to be sawn, as well as a depresser device which prevents the workpieces from lifting off the conveyor chain during sawing and which, in the workpiece conveyance direction, comprises at least one presser device in front of and behind the circular saw blades.

BACKGROUND TO THE INVENTION

In known multiple blade circular sawing machines with parallel trimming devices, two presser rollers are arranged at a distance from one another respectively in front of and behind the circular saw blades. Since troublefree operation is ensured only if the workpiece is pressed upon the conveyor chain by at least two presser rollers, the minimum length of the workpiece is predetermined by the spacing of the presser rollers. In known machines, this minimum length of the workpiece is predetermined by the spacing of the presser rollers. In known machines, this minimum length amounts to approximately 750 mm. If shorter workpieces are treated, they are pressed against the conveyor chain during the sawing process merely by a single presser roller for a portion of the travel path. Thus, during the throughfeed, varying lever arm conditions are produced, which, when the cutting force remains the same, initiate lifting off or fluttering of the workpieces, so that there is a risk that either the workpieces are destroyed by the saw blades or at least they leave the machine with an unclean cut.

It is an object of the present invention to develop further a multiple blade circular sawing machine with parallel trimming device of the kind described heretofore in such a manner that relatively long workpieces and in addition thereto also short workpieces (approximately 260 mm) of any desired width and thickness can be cut with at least one stationary and one displaceable saw blade

SUMMARY OF THE INVENTION

According to the invention the depresser device comprises for each saw blade a respective depresser member which possesses a slot which extends in the longitudinal direction of the member and through which projects the respective saw blade, wherein the or each displacer head is connected to a respective depresser member and is displaceable with it to a defined position and is fixable in this position, and in each depresser member at least one presser roller is provided on each side of the saw blade in the sawing region, by means of which presser roller the workpiece to be sawn may be pressed against the conveyor chain.

By means of the features according to the invention, for the first time a multiple blade circular sawing machine with a parallel trimming device has been produced by means of which even very short workpieces (approximately 260 mm) can be cut without the danger existing in this case that the workpieces are lifted off the conveyor chain and are destroyed in the machine, or are not clearly cut because of the appearance of flutter. This manner of working is a result of the fact that the workpieces are pressed by the presser rollers in the cutting region against the conveyor chain, i.e. at the location at which the cutting forces of the saw blade affect the workpiece. Because of the arrangement of the presser rollers in the depresser members, this depresser effect is ensured in the cutting region even if a circular saw blade is displaced by means of its displacer head to a different position.

According to an advantageous further development of the invention, two presser rollers are mounted on both sides of the slot in the sawing region of the circular saw blade. In this way even shorter workpieces can also be securely held during the cutting process.

In a preferred embodiment, the connection between the depresser member and the displacer head comprises two columns which extend perpendicular to the plane of the conveyor chain and each of which is mounted in a vertically displaceable manner in a respective column guide at the displacer head on both sides of the driving shaft; at its lower end each column is connected to the depresser member. Such a construction is operationally reliable and permits without problems the height of the depresser member to be adjusted to the height of the respective workpieces to be treated, without risk of tilting.

In order to improve the mounting of the depresser members, it is advantageous to guide the same in the region of their ends for displacement in the longitudinal direction of the driving shaft. A particularly advantageous constructional form of such a guide comprises two guide rods which extend through the ends of the depresser members and which run parallel to the driving shaft. Such an embodiment is technically simple and operationally reliable.

For the purpose of mounting the guide rods it is advantageous to connect them in a pivotal manner in the region of their ends to swing arms. These swing arms extend substantially perpendicular to the guide rods and permit in this way adjustment to different workpiece heights in a simple manner.

In a preferred embodiment, an additional presser roller is mounted in the region of each of the ends of each depresser member in the plane of the saw blade. It is attained thereby that in the cutting region each workpiece is pressed against the conveyor chain by altogether three presser rollers. Thereby a possible rocking movement of the workpiece after the start of the cut is excluded.

DESCRIPTION OF THE PREFERRED EMBODIMENT

Figure 1:
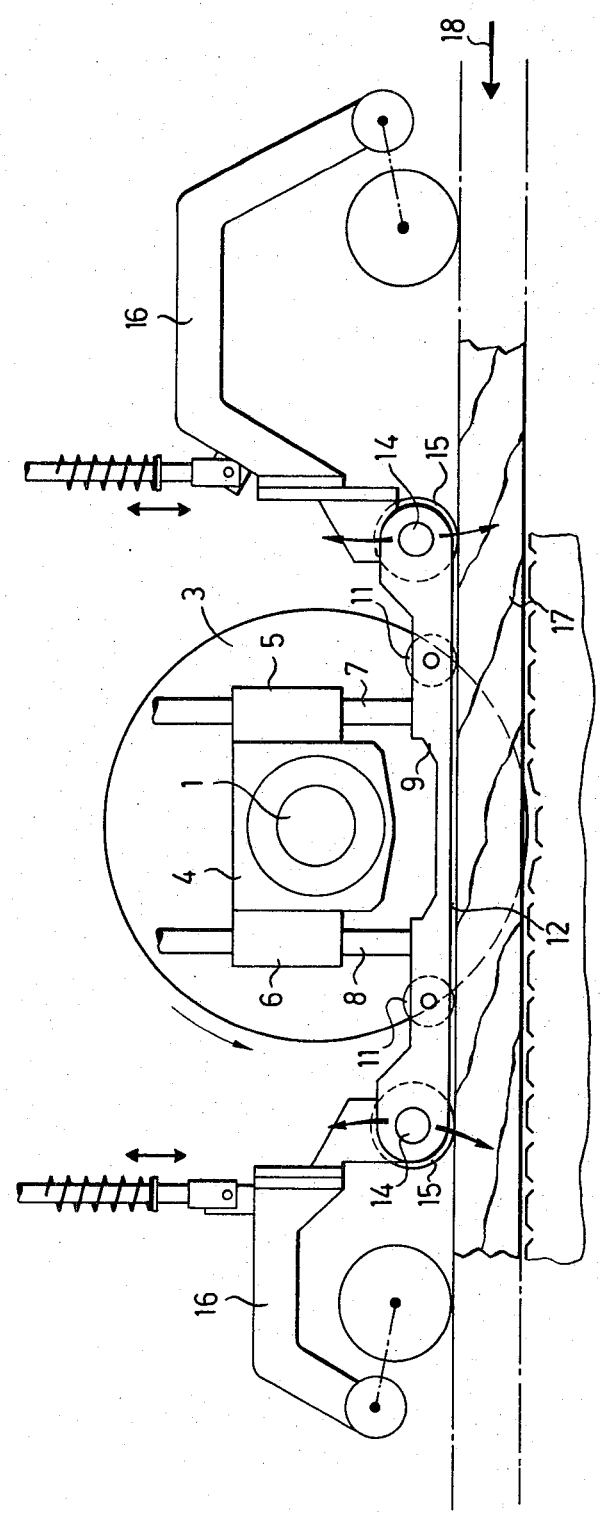
FIG. 1 is a diagrammatic side view of part of a multiple blade circular sawing machine with a parallel trimming device, with motor-driven or electrical blade displacement.

As will be clear from the FIGS., two circular saw blades 2 and 3 are mounted at a certain distance from one another on a shaft 1 which is driven by an electromotor (not illustrated). In the present example the saw blade 2 is non-displaceable in the longitudinal direction of the shaft 1. In contrast, the saw blade 3 is mounted in a displacer head 4 which is displaceable in the longitudinal direction of the shaft 1 and which is fixable in a desired position by means not illustrated.

The head 4 comprises column guides 5 and 6 which are arranged on both sides of the shaft 1 and which support columns 7 and 8 extending perpendicular to the shaft 1; at their lower ends the columns 7, 8 are connected to an elongate member 9 forming part of a depresser device.

In its centre, the depresser member 9 has a slot 10 through which the saw blade 3 extends. Moreover, on both sides of the slot 10 the depresser member 9 is equipped with a total of four rollers 11 which are mounted in slots and which project slightly beyond the lower edge 12 of the member 9.

The depresser member 13 which is associated with the blade 2 is constructed substantially in the same manner as the depresser member 9.

In the region of their ends, the depresser members 9 and 13 are provided with bores through which extend guide rods 14 parallel to the shaft 1. In the region of the members 9 and 13, the rods 14 support rollers 15 which project beyond the lower edges 12 of the members 9 and 13 by the same amount as do the rollers 11.

In the region of their ends, the rods 14 are rotatably connected to the free end of swing arms 16 which are mounted on the frame of the machine in a manner not illustrated in detail.

In operation, the rollers 11 and 15 of the depresser devices press upon the upper surface of a workpiece 17 which is conveyed continuously through the machine in the direction of the arrow 18 and with a predetermined rate of advance for performing the sawing process, by means of a conveyor chain which is merely indicated in FIG. 1. Thereby the workpiece 17 is prevented from lifting off the conveyor chain during the sawing process.

Figure 2:
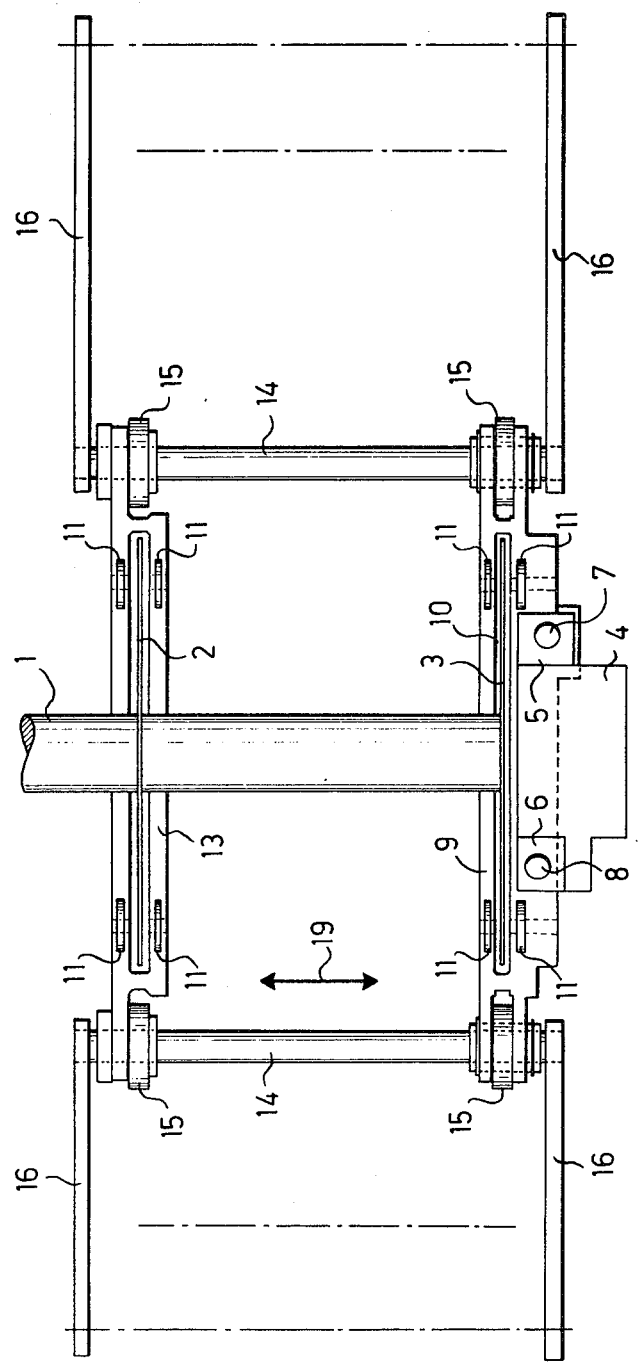
FIG. 2 is a diagrammatic plan view of the same part of the machine. For reasons of clarity, both FIGS. illustrate merely the components of a multiple blade sawing machine with a parallel trimming device which are necessary for the understanding of the present invention.

If the spacing between the saw blades 2 and 3 is to be altered for conversion to a different sawing width, the displacer head 4 only has to be displaced as indicated by the arrow 19 (FIG.2) and fixed in its new position. Thereby, not only the saw blade 3 but also the associated depresser member 9 is moved to the correct new position without special conversion operations being necessary for this purpose.

I claim:
1. A multiple blade circular saw machine comprising
    (a) conveyor means for continuously advancing a workpiece in a given direction;
    (b) a driving shaft extending transversely to the advancing direction, above the conveyor means;
    (c) at least two circular saw blades coaxially mounted on the driving shaft at spaced-apart positions, the saw blades rotating with the shaft;
    (d) at least two elongate depresser members extending parallel to the advancing direction, between the driving shaft and the conveyor means, each depresser member having a longitudinal slot through which a respective one of the saw blades extends, at least one presser roller being mounted on the depresser member upstream of the shaft with respect to the advancing direction, and at least one presser roller being mounted on the depresser member downstream of the shaft, the presser rollers extending beneath the depresser member adjacent the respective saw blade so as to press the workpiece against the conveyor means; and
    (e) at least one displacer head defining the location of a respective one of the saw blades along the shaft, the displacer head being movable along the shaft together with the respective saw blade and being fixable at a given position, the respective depresser member being mounted on the respective displacer head.

2. The machine of claim 1, in which, for each depresser member, there is a pair of upstream presser rollers and a pair of downstream presser rollers, the slot passing between the rollers of each pair.

3. The machine of claim 1, in which the displacer head has two vertical guides between which the shaft passes, and two vertical columns dispaceably mounted in the respective guides, the lower ends of the columns being connected to the depresser member.

4. The machine of claim 1, including means for guiding the ends of the depresser members in the longitudinal direction of the driving shaft.

5. The machine of claim 4, in which the guiding means comprises two guide rods which extend through the ends of the depresser members and which extend parallel to the driving shaft.

6. The machine of claim 5, in which the guide rods are connected to swing arms which extend transversely to the guide rods.

7. The machine of claim 1, in which in each end of each depresser member a respective additional presser roller is mounted in the plane of the respective saw blade.

* * * * *